United States Patent [19]

Kim

[11] Patent Number: 5,323,379
[45] Date of Patent: Jun. 21, 1994

[54] DISK CLAMPING APPARATUS INCLUDING A CLAMP HAVING A PLURALITY OF CLAMP JAWS MOVABLE HORIZONTALLY

[75] Inventor: Gyu-Chul Kim, Kyonggi-do, Rep. of Korea

[73] Assignee: Samsung Electronics Co., Ltd., Kyunggi-do, Rep. of Korea

[21] Appl. No.: 915,505

[22] Filed: Jul. 20, 1992

[30] Foreign Application Priority Data

Jul. 20, 1991 [KR] Rep. of Korea .................. 91-12438

[51] Int. Cl.$^5$ ................ G11B 17/028; G11B 25/04
[52] U.S. Cl. .................................. 369/270; 369/264
[58] Field of Search ................. 369/270, 271, 264; 360/99.12

[56] References Cited

U.S. PATENT DOCUMENTS

| | | | |
|---|---|---|---|
| 2,762,627 | 9/1956 | Johnson | 369/270 |
| 4,562,570 | 12/1985 | Denton | 369/270 |
| 4,853,924 | 8/1989 | Takahashi et al. | 369/270 |
| 5,056,082 | 10/1991 | Ekhoff | 360/99.12 |
| 5,166,920 | 11/1992 | Kogure | 369/270 |

FOREIGN PATENT DOCUMENTS

| | | | |
|---|---|---|---|
| 57-82261 | 5/1982 | Japan | 360/99.12 |
| 61-9802 | 1/1986 | Japan | 369/270 |

OTHER PUBLICATIONS

IBM Technical Disclosure Bulletin, "Spindle Assembly For Record Disk Apparatus," vol. 20, No. 12, May 1978 By Quinton.

*Primary Examiner*—Stuart S. Levy
*Assistant Examiner*—Brian E. Miller
*Attorney, Agent, or Firm*—Sughrue, Mion, Zinn, Macpeak & Seas

[57] ABSTRACT

A disk drive mechanism includes a disk clamping apparatus which has an improved structure and which is easily fabricated, thereby to reduce costs. The disk clamping apparatus includes a clamp having a plurality of clamp jaws movable horizontally, such that the apparatus is compact. The clamp also includes first and second grooves formed according to central hole sizes of the disks to be accommodated on the turntable so that the clamp can be used for both a compact disk and a laser disk.

22 Claims, 3 Drawing Sheets

DISK CLAMPING APPARATUS INCLUDING A CLAMP HAVING A PLURALITY OF CLAMP JAWS MOVABLE HORIZONTALLY

BACKGROUND OF THE INVENTION

1. Field of the Invention

The present invention relates to a disk drive mechanism for reading data recorded on a disk, such as a compact disk or a laser disk, and, more particularly, to a disk clamping apparatus arranged in a disk drive mechanism, which fixedly sets a disk onto a turntable by the centrifugal force resulting from the rotation of a motor rotating the disk so as to read out data from the disk.

2. Description of the Prior Art

Generally, a disk drive mechanism has a turntable having an upper surface on which a disk is stably set, a motor for rotating the turntable, a clamping device for clamping the disk onto the turntable and a pickup for reading data recorded on the disk.

In the disk drive mechanism, the clamping device includes a rack slidably arranged on a slider member, a cam rotated by the movement of the rack, a clamping arm upwardly and downwardly rotated to be centered with a hinge according to the cam rotation, and a clamp driven according to the upward and downward rotation of the clamping arm for clamping the disk onto the turntable.

The clamping device thus constructed serves to stably set the disk on the turntable to prevent undesirable effects, for example, noise, short-signal and jitter, resulting from the disk being eccentrically set on the table or the disk being vibrated due to an external shock.

FIG. is a front view of a conventional disk drive mechanism, in which a partial cross-section of the mechanism is shown to illustrate the operation of the disk clamping apparatus. In FIG. 1, 1 denotes the disk on which data is recorded or read out, 2 denotes the turntable on which the turntable is stably set, and 3 denotes a motor for rotating the turntable 2.

Further, 4 denotes a rotational shaft transferring the force of the motor 3 to the turntable 2. 5 denotes a pickup for recording or reading data on or from the disk 1. The pickup 5 records or reads data on or from the disk while maintaining a predetermined distance from the disk 1. 6 denotes a slider for moving the pickup 5. The slider 6 has the pickup 5 mounted at one side thereof and a rack 6a is arranged at the other side of the slider 6.

7 denotes a guide bar for guiding the movement of the slider 6, and 8 denotes a cam rotated by the rack 6a engaged with the slider 6. The cam 8 has a gear 8a formed at a portion of its outer periphery, so that the cam 8 is rotatably driven by the rack 6a and gear 8a being engaged together when the rack 6a, disposed on the slider 6, is moved rightwardly and leftwardly. 9 denotes a clamp arm upwardly and downwardly rotated to be centered with a hinge 9a formed at an end of the clamp arm 9 in response to the rotation of the cam 8. 10 denotes a clamp disposed at the other end of the clamp arm 9 for stably fixing the disk 1 onto the turntable 2, and 11 denotes a spring for downwardly biasing the clamp arm 9 to control the pressure applied to the disk 1, set on the turntable 2, from the clamp 10.

With the above-described construction and looking at FIG. 1, when the slider 6 is rightwardly moved along the guide bar 7 by a slider moving means (not shown), the rack 6a arranged on the slider 6 is engaged with the gear 8a formed on the outer periphery of the cam 8. Consequently, the cam 8 is rotated leftwardly (i.e., in the counterclockwise direction).

When the cam 8 is leftwardly rotated, the clamp arm 9 is upwardly rotated and moved centering with the hinge 9a. Upon being rotated, the clamp arm 9 is centered with the hinge 9a, and the clamp 10 is upwardly lifted. Therefore, the disk 1 is removably set on the turntable 2.

When the disk 1 is set on the turntable 2 by an operator, the slider 6 is leftwardly moved along the guide bar 7 by the slider moving means, and then the cam 8 is rightwardly rotated (i.e., in the clockwise direction) according to the movement of the slider 6. By the cam rotation, the clamp arm 9 downwardly descends and centers itself with the hinge 9a by its own weight or by the weight of the clamp 10. Accordingly, the clamp 10 stably fixes the disk set on the turntable 2. Herein, the spring 11 serves to downwardly rotate the clamp arm 9 and to control the pressure of the clamp 10 provided on the disk 1.

Under this condition, when the disk drive mechanism is operated, the motor 3 rotates, so that the rotational force is transferred to the turntable 2 through the rotational shaft 4. As a result, the turntable 2 is rotated and the disk 1 fixed on the turntable 2 by the clamp 10 also is rotated.

Simultaneously with the rotation of the disk 1, the slider 6 is moved leftwardly and the pickup 5 records or reads data onto or from the disk 1.

Hence, the conventional disk clamping apparatus includes the rack being movable on the slider, the cam rotatable according to the movement of the rack, the clamp arm upwardly and downwardly rotatable to be centered with the hinge depending upon the cam rotation, and the clamp for clamping the disk set on the turntable by the upward and downward rotation of the clamp arm. Thus, the structure of this conventional apparatus is extremely complicated.

Accordingly, in such a conventional disk drive mechanism, it is difficult to manufacture the disk clamping apparatus and manufacturing costs are relatively high. Further, the clamp is located on the upper side of the disk 1 and operated upwardly and downwardly. Hence, the disk drive mechanism must be designed so that the entire height of the apparatus, to include the range of motion of the clamp, can be accommodated. Therefore, the mechanism is not compact. Further, the turntable and the clamp for stably supporting the disk are previously limited in structure (e.g., independently designed and manufactured), so that a compact disk and a laser disk, each having a differently sized hole formed at their interiors for stably setting the respective disk on the turntable, are not compatibly used in the mechanism.

SUMMARY OF THE INVENTION

Accordingly, an object of the present invention is to provide a disk clamping apparatus which has a simple structure and which can be easily fabricated while reducing the manufacturing cost.

Another object of the present invention is to provide a disk clamping apparatus in which a clamp is rightwardly and leftwardly, e.g., horizontally, moved into the hole of the respective disk, and thus the apparatus is greatly reduced in height to make the apparatus compact.

Still another object of the present invention is to provide a disk clamping apparatus in which a clamp can be operated corresponding to a hole size of the disk to ensure the compatibility between a compact disk (CD) and a laser disk (LD).

To achieve the above objects, the present invention includes a disk clamping apparatus comprising: a turntable for setting at least a first kind of disk on an upper surface thereof a plurality of guide members radially extending toward a rotational shaft from the inner side of the turntable; a clamp formed with a plurality of clamp jaws movably guided by the guide members, and having grooves formed on the outer periphery of the clamp for accommodating the disk; and a plurality of resilient members for urging the clamp jaws of the clamp toward the rotational shaft, wherein the disk is clamped by the clamp jaws movable by the centrifugal force generated as the disk is rotated, and the apparatus can selectively accommodate a compact disk and a laser disk.

The above and other objects, features and advantages of the present invention will be apparent from the following description taken with reference to the accompanying drawings.

BRIEF DESCRIPTION OF THE DRAWINGS

FIG. 5A is a cross-sectional view illustrating the operational state when a compact disk is set on the turntable, and FIG. 5B is a cross-sectional view illustrating the operational state when a laser disk is set on the turntable.

DETAILED DESCRIPTION OF THE PREFERRED EMBODIMENT

Hereinafter, a preferred embodiment of the present invention will be described in detail.

Figure 1:
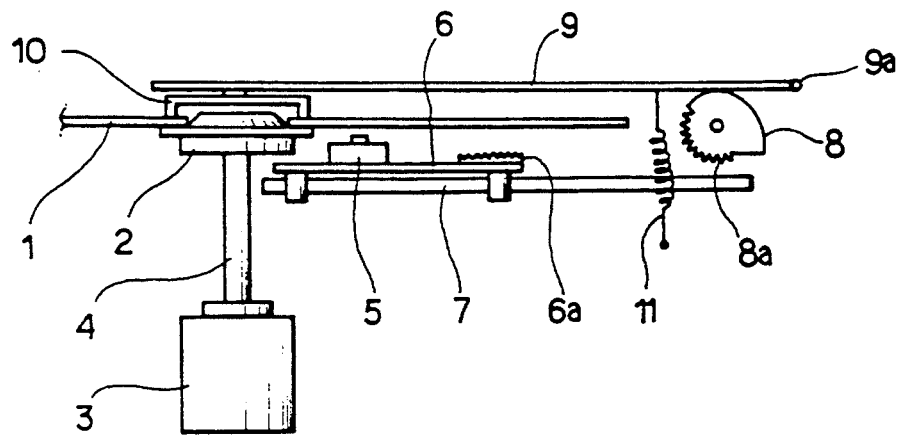
FIG. 1 is a partly cross-sectional front view of a disk drive mechanism, illustrating an operation of a conventional disk clamping apparatus arranged in the mechanism.
Figure 2:
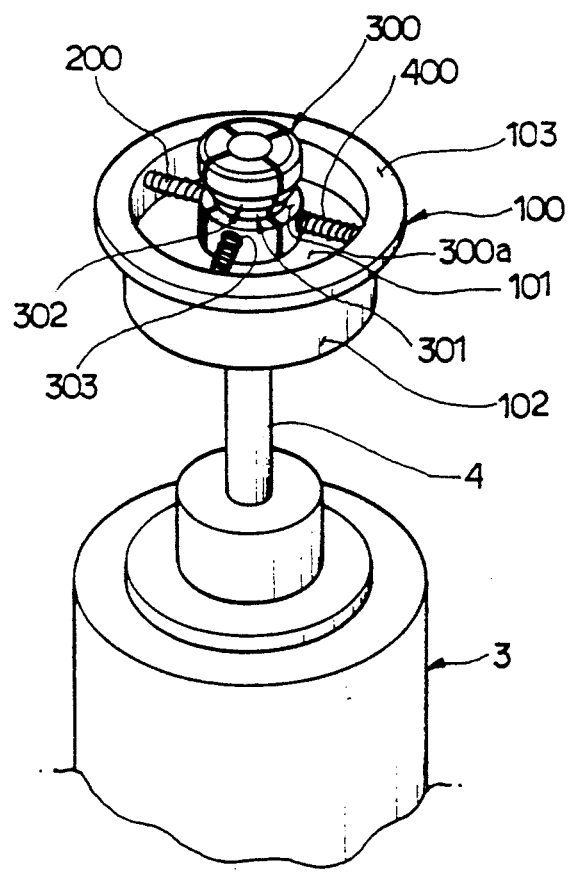
FIG. 2 is a perspective view of a disk drive mechanism employed with a disk clamping apparatus according to the present invention.

Referring to FIG. 2, a disk drive mechanism having a disk clamping apparatus employed therein, includes a turntable 100 having an upper surface on which a disk, such as a compact disk, a laser disk or the like, is stably set, and a plurality of guide members 200 disposed toward a central rotational shaft 4 from a side of a cylindrically-shaped portion of the turntable 100. The mechanism further includes a clamp 300 formed with a plurality of clamp jaws (e.g., 320a, 320b, 320c and 320d shown in FIG. 3) movably disposed along the guide members 200, and having grooves formed on its outer periphery for stably fixing the different disks, and springs 400 serving as resilient members for centralizing the clamp jaws of the clamp 300 around the rotational shaft.

In the mechanism thus constructed, the turntable 100 comprises a bottom plate 101, a cylindrically-shaped portion 102 upwardly extending from the outer periphery of the bottom plate 101, and a flat upper portion outwardly extending from the upper end of the cylindrically-shaped portion 102. In the thus-constructed turntable 100, the bottom plate 101 is fixedly mounted to the rotational shaft 4 of a motor 3, so that the plate 101 can be rotated by a rotational force of the motor 3 transferred through the shaft 4. The guide members 200 are fixedly disposed at the inner side of the cylindrically-shaped portion 102 of the turntable 100 parallel to the bottom plate 101 in a direction towards the center (i.e., towards the rotational shaft 4) of the turntable 100. The guide members 200 comprise at least cylindrical bars, or angled bars.

The clamp 300 is formed with at least two clamp jaws radially arranged to have a cylindrical shape centered on the rotational shaft 4.

Moreover, the clamp 300 has a first groove 301 having a width suitable to properly accommodate a compact disk and a second groove 302 having a width suitable for accommodating a laser disk. That is, the first groove 301 has a width approximately equal to or somewhat larger than a thickness of the compact disk while the second groove 302 has a width approximately equal to or somewhat larger than a thickness of the laser disk. The second groove 302 used for the laser disk is larger in width than the first groove 301 used for the compact disk. The first and second grooves 301 and 302 have a commonly occupied bottom surface at the outer periphery of the clamp 300. The bottom surface 300a commonly defined between the first and second grooves 301 and 302 are formed on the same plane as the upper surface of the cylindrical edge of the turntable 100. Preferably, the first groove 301 has the same curvature as that of the inside diameter of the compact disk, and the second groove 302 has the same curvature as that of the inside diameter of the laser disk. Therefore, the second groove 302 has a circumference larger than that of the first groove 301. Additionally, below the first and second grooves 301 and 302 guide holes 303 are formed in the same number as the guide members 200.

Additionally, the guide members 200 are formed in the same number as the clamp jaws of the clamp 300. Therefore, each of the guide holes 303 is formed corresponding to a respective one of the clamp jaws forming the clamp 300.

The springs 400 centralize the clamp 300, having at least two clamp jaws around the rotational shaft. The guide members 200 fixed to the turntable are inserted in the springs 400 so as to trap the springs 400 between the sides of the turntable and the respective clamp jaws.

Figure 3:
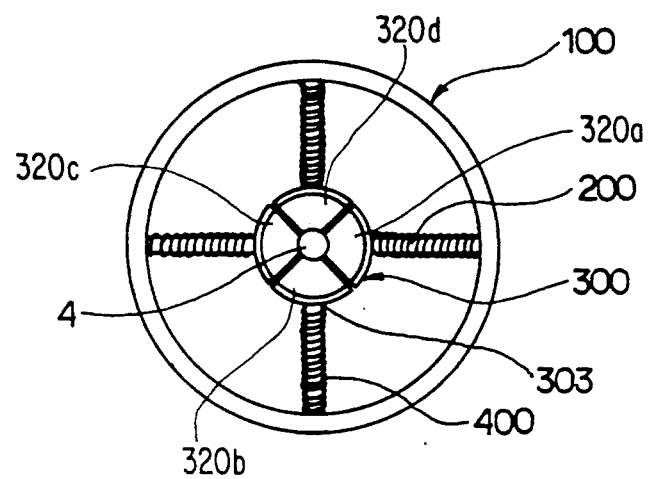
FIG. 3 is a plan view of the disk drive mechanism employed with the disk clamping apparatus shown in FIG. 2.

Referring now to FIG. 3, there is shown a plan view of the disk drive mechanism employed with the disk clamping apparatus according to the present invention.

In FIG. 3, the guide members 200 are fixedly disposed at the inside of the turntable 100. The guide members 200 are formed in a number corresponding to the equally divided clamp jaws of the clamp 300 and are arranged leading toward the rotation shaft 4. The clamp 300 having a plurality of jaws is circularly formed when centered around, i.e., centralized toward, the rotational shaft 4. According to the present invention, the outer diameter of clamp 300 when the jaws are centralized around the shaft is smaller than that of a hole formed in the center of the compact disk. Preferably, the clamp 300 has an outer diameter approximately equal to that of the central hole of the compact disk for smoothly mounting the disk on the turntable.

The clamp 30 is formed with the guide holes 303 through which the clamp jaws can be moved along the guide members 200 so that a plurality of the clamp jaws are movable toward the turntable 100 along the guide members 200.

As described above, the guide members 200 fixedly disposed at the inner sides of the turntable 100 are inserted into the interior of the springs, thereby to prevent the springs 400 from coming loose. The jaws of the clamp 300 movable along the guide members 200 are centered on the shaft due to the biasing force of the springs 400.

Figure 4:
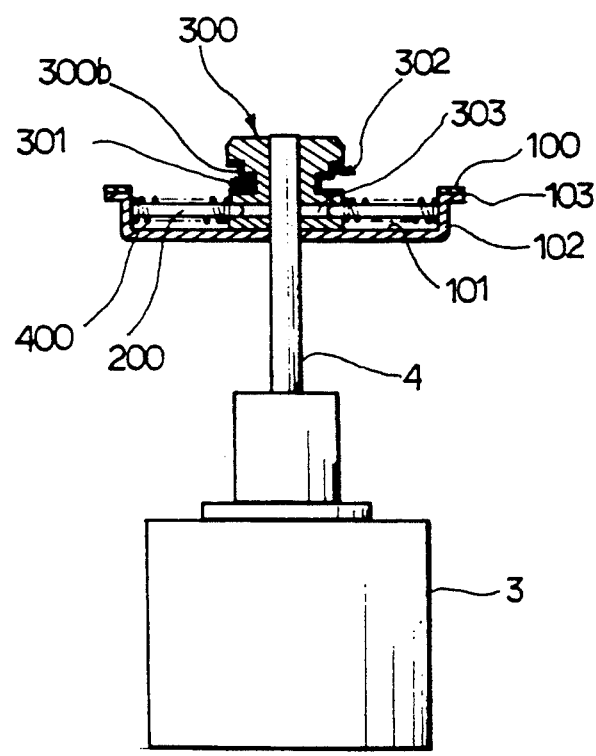
FIG. 4 is a cross-sectional view of the disk drive mechanism employed with the disk clamping apparatus shown in FIG. 2.

Referring to FIG. 4, the bottom plate 101 of the turntable 100 is fixedly mounted on the rotational shaft 4 of the motor 3, and the guide members 200 are fixedly arranged on the inner wall of the cylindrically-shaped portion 102 of the turntable 100 in a balanced relationship with the bottom plate 101. Moreover, the first and second grooves 301 and 302 are formed in two stages on the outer surface of the clamp 300, each groove having a width equal to or somewhat larger than the thickness of the compact disk and a laser disk, respectively, so as to stably accommodate the disks. Additionally, the second groove 302 has a thickness elongated from the first groove 301, so that the grooves have a common bottom surface defined therebetween. The guide holes 303 formed at the lower side of the first and second grooves 301 and 302 of the clamp 300 extend through the outer surface of the clamp to the rotational shaft 4. The diameter of the guide holes 303 is larger than that of the guide members 200 so that the clamp jaws can be moved through the guide holes 303. Further, the guide members 200 have a length sufficient to maintain a condition that an end of the respective guide members 200 can be inserted into the corresponding guide hole 303 when the clamp jaws of the clamp 300 are centered around the rotational shaft 4 due to the biasing force of the springs 400.

Meanwhile, friction members 100b and 300b are attached on the upper flat portion 103 and the inside of the first and second grooves 301 and 302. Preferably, the friction members 100b and 300b are made of soft rubber or fibroid material having a high coefficient of friction.

Figure 5A:
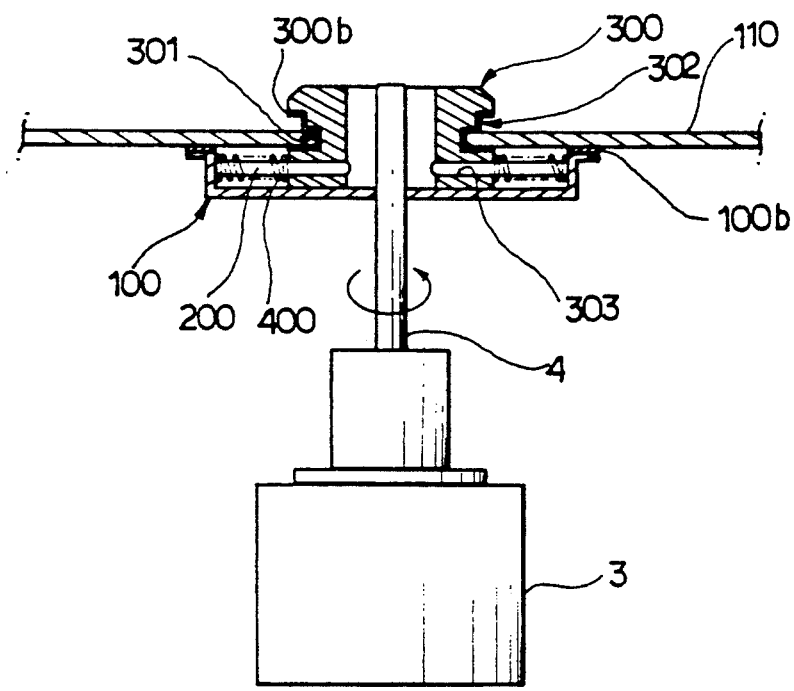
FIGS. 5A and 5B are views illustrating operational states of the disk drive mechanism employed with the disk clamping apparatus according to the present invention, and, more particularly.
Figure 5B:
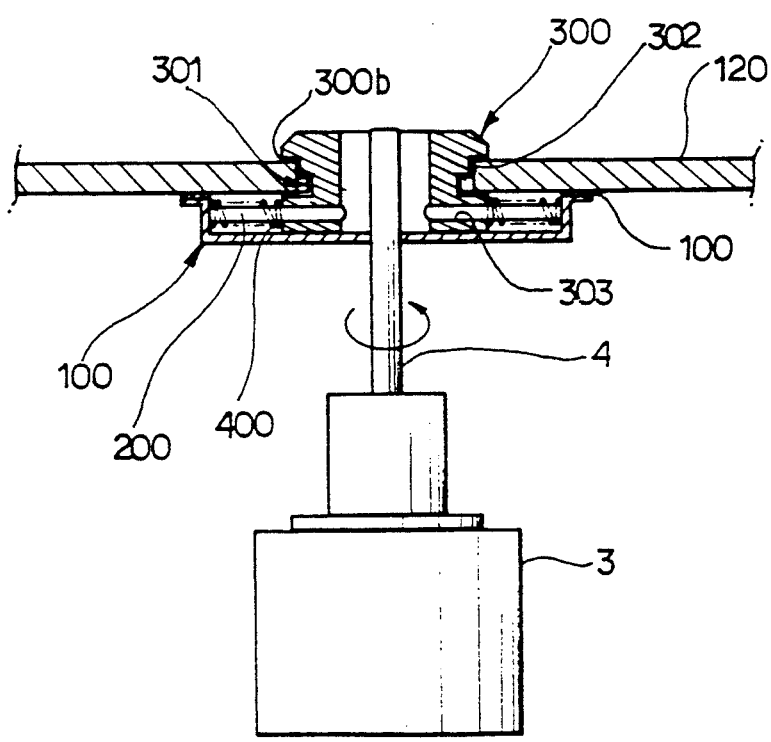

FIGS. 5A and 5B are cross-sectional views illustrating the operational state of the disk drive mechanism having the disk clamping apparatus according to the present invention, wherein FIG. 5A is a cross-sectional view showing the operational state of the mechanism when the compact disk is set on the turntable, and FIG. 5B is a cross-sectional view showing the operational state of the mechanism when the laser disk is set on the turntable 100.

Referring to FIG. 5A, when the motor 3 is driven with the CD 110 set on the turntable 100, the turntable 100 fixedly mounted on the rotational shaft 4 is thus rotated. Upon rotation of the turntable 100, the clamp jaws of the clamp 300 are moved along the guide members 200 through the guide holes 303.

In this case, the end of the respective guide members 200 are inserted into the corresponding guide holes 303 formed at the bottom of the clamp 300, and then the clamp 300 is rotated in response to the rotation of the turntable 100.

Consequently, centrifugal force is produced according to the rotation of the clamp 300, so that the clamp 300, divided into a plurality of clamp jaws, is moved outwardly along the guide members 200 due to the centrifugal force. When the clamp 300 is separately moved, the compact disk 110 can be set on the first groove 301 formed at the outer periphery thereof. As the rotation speed of the turntable is increased, the centrifugal force also is increased and a clamping force between the first groove 301 and the disk 101 is increased. At this time, the springs 400 are compressed by the clamp 300.

Under the above-described condition, the rotational force of the motor 3 is effectively transferred to the disk 110 through the friction member 100b attached to the upper flat portion 103 of the turntable 200 and the friction member 300b provided for the groove 301 of the clamp 300.

When the motor 3 is stopped, the centrifugal force of the clamp 300 is also stopped and the clamp jaws move toward the rotational shaft 4 as the springs decompress. Thus, the clamp 300 is moved toward the rotational shaft 4 along the guide members 200 due to the urging force of the springs 400.

As the clamp 300 is moved toward the rotational shaft 4, the disk 110 is separated from the first groove 301. As a result, the disk 110 can be removed from the disk drive mechanism.

Alternatively, as shown in FIG. 5B, when the motor 3 is rotated with a laser disk 120 set on the turntable 100, the disk clamping apparatus, having the rotational shaft 4, turntable 100 and guide members 200 and the like, is also rotated, thereby to produce the centrifugal force.

Therefore, the clamp 300 formed with a plurality of clamp jaws is outwardly moved along the guide members 200 by the centrifugal force resulting from the rotation of the turntable.

When the clamp 300 is extended outwardly, the laser disk 120 can be clamped to the second groove 302 formed at the outer periphery of the clamp 300. As the rotational speed of the turntable increases, the clamping force between the second groove 302 and the disk 120 also increases.

Under the above-described condition, the rotational force of the motor 3 is effectively transferred to the disk 120 through the friction member 100b attached to the upper surface of the turntable 100 and the friction member 300b provided for the groove 302 of the clamp 300.

When the motor 3 is stopped, the centrifugal force generated by rotation of the clamp 300 is also stopped. Accordingly, the clamp jaws of the clamp 300 are moved toward the rotation shaft 4 along the guide members 200 due to the biasing force of the springs 400.

As the jaws of the clamp 300 are extended by the springs toward the rotational shaft 4, the disk 120 is separated from the second groove 302. As a result, the disk 120 can be removed from the disk drive mechanism.

As described above, according to the disk clamping device of the mechanism, the structure of the apparatus is simple and the apparatus is efficiently manufactured. Additionally, the manufacturing costs are decreased and the apparatus can accommodate both the compact disk and the laser disk.

Although the present invention has been described with reference to the specified embodiment, many changes and modifications will be made therein without departing from the scope and spirit of the invention.

What is claimed is:

1. A disk clamping apparatus, comprising:

a rotational shaft;

a turntable, coupled to said rotational shaft, for accommodating at least one kind of disk on an upper surface thereof;

a plurality of guide members fixedly coupled to said turntable and radially extending toward said rotational shaft;

a clamp including a plurality of clamp jaws movably guided by the plurality of guide members, said clamp having at least one groove formed on its outer periphery for accommodating at least one kind of disk; and a plurality of resilient members for urging the plurality of clamp jaws toward the rotational shaft such that said plurality of clamp jaws are centered therearound, wherein, as said turntable is rotated by said rotational shaft, the disk accommodated on said turntable is clamped by the plurality of clamp jaws, said plurality of clamp jaws being movable in a direction away from said rotational shaft by centrifugal force generated as said turntable is rotated by said rotational shaft and wherein said plurality of guide members are respectively inserted into said plurality of resilient members.

2. A disk clamping apparatus according to claim 1, wherein the turntable comprises a flat bottom plate, a cylindrically-shaped portion upwardly extending from the outer periphery of the bottom plate, and an upper flat portion outwardly extending from an end of the cylindrically-shaped portion and having a flat upper surface.

3. A disk clamping apparatus according to claim 2, wherein the flat upper surface of the turntable has a friction member coupled thereto.

4. A disk clamping apparatus according to claim 1, wherein the plurality of guide members are fixedly disposed at an inner side of the cylindrically-shaped portion of the turntable and extend parallel to the bottom plate in a direction toward the rotational shaft.

5. A disk clamping apparatus, comprising:
a rotational shaft;
a turntable, coupled to said rotational shaft, for accommodating at least one kind of disk on an upper surface thereof;
a plurality of guide members fixedly coupled to said turntable and radially extending toward said rotational shaft;
a clamp including a plurality of clamp jaws movably guided by the plurality of guide members, said clamp having at least one groove formed on its outer periphery for accommodating at least one kind of disk; and
a plurality of resilient members for urging the plurality of clamp jaws toward the rotational shaft such that said plurality of clamp jaws are centered therearound,
wherein, as said turntable is rotated by said rotational shaft, the disk accommodated on said turntable is clamped by the plurality of clamp jaws, said plurality of clamp jaws being movable in a direction away from said rotational shaft by centrifugal force generated as said turntable is rotated by said rotational shaft,
wherein the clamp is formed with said plurality of clamp jaws radially arranged to be centered around the rotational shaft, said at least one groove including a first groove and a second groove formed at the outer periphery of said clamp, said clamp further including a plurality of guide holes formed below the first groove so that the plurality of clamp jaws are movable along the plurality of guide members through the plurality of guide holes, respectively.

6. A disk clamping apparatus according to claim 5, wherein the first groove and the second groove each have inner surfaces having friction members formed thereon.

7. A disk clamping apparatus according to claim 5, wherein the first groove formed at the outer periphery of the clamp has a width no less than a thickness of a first type of disk.

8. A disk clamping apparatus according to claim 5, wherein the second groove formed at the outer periphery of the clamp has a width no less than a thickness of a second type of disk.

9. A disk clamping apparatus according to claim 5, wherein the plurality of guide holes extend from the outer periphery of the clamp completely through the clamp so as to be opposed to the rotational shaft.

10. A disk clamping apparatus according to claim 1, wherein the resilient members are positioned between the turntable and the plurality of clamp jaws.

11. A disk clamping apparatus according to claim 1, wherein said clamp includes a plurality of grooves for accommodating a plurality of different kinds of disks.

12. A disk clamping apparatus according to claim 1, wherein said plurality of guide members comprise cylindrical bars.

13. A disk clamping apparatus according to claim 1, wherein said plurality of clamp jaws are radially arranged to have a cylindrical shape and to be symmetrically centered on said rotational shaft.

14. A disk clamping apparatus according to claim 1, wherein said at least one groove includes a first groove and a second groove, said first groove having a width for accommodating a compact disk, and said second groove having a width for accommodating a laser disk.

15. A disk clamping apparatus, comprising:
a rotational shaft;
a turntable, coupled to said rotational shaft, for accommodating at least one kind of disk on an upper surface thereof;
a plurality of guide members fixedly coupled to said turntable and radially extending toward said rotational shaft;
a clamp including a plurality of clamp jaws movably guided by the plurality of guide members, said clamp having at least one groove formed on its outer periphery for accommodating at least one kind of disk; and
a plurality of resilient members for urging the plurality of clamp jaws toward the rotational shaft such that said plurality of clamp jaws are centered therearound,
wherein, as said turntable is rotated by said rotational shaft, the disk accommodated on said turntable is clamped by the plurality of clamp jaws, said plurality of clamp jaws being movable in a direction away from said rotational shaft by centrifugal force generated as said turntable is rotated by said rotational shaft,
wherein said at least one groove includes a first groove and a second groove, said first groove having a width for accommodating a compact disk, and said second groove having a width for accommodating a laser disk, said first groove and said second groove having a commonly occupied surface at the outer periphery of the clamp.

16. A disk clamping apparatus according to claim 1, wherein said plurality of guide members are fixedly disposed on a side of said turntable closest to said rotational shaft.

17. A disk clamping apparatus according to claim 2, wherein said bottom plate is fixedly mounted on said rotational shaft.

18. A disk clamping apparatus according to claim 6, wherein said friction members comprise a material having a coefficient of friction higher than that of said first groove and said second groove, said friction members comprising one of a rubber and fibroid material.

19. A disk clamping apparatus according to claim 3, wherein said friction member has a coefficient of friction higher than that of said upper flat portion of said turntable, said friction member comprising one of a rubber and fibroid material.

20. A disk clamping apparatus, comprising:
a shaft;
a mechanism, coupled to said shaft, for accommodating a plurality of kinds of disks, said mechanism accommodating one disk at a time;
a plurality of guide members fixedly coupled to said disk accommodating mechanism and extending toward said shaft;
a clamping mechanism having a plurality of clamping portions, said plurality of clamping portions being movably guided by the plurality of guide members, said clamping mechanism, on its outer periphery, having a plurality of grooves for accommodating said plurality of kinds of disks;
urging members for urging the plurality of clamping portions in a first direction to center said plurality of clamping portions around said shaft; and
an actuator, coupled to said shaft, for rotating said shaft,
wherein, as said shaft is rotated by said actuator, a disk accommodated on said disk accommodating mechanism is clamped by said clamping mechanism being moved in a direction opposite to said first direction; and
wherein said plurality of guide members are respectively inserted into said urging members.

21. A disk clamping apparatus, comprising:
a rotational shaft;
a turntable, coupled to said rotational shaft, for accommodating at least one kind of disk on an upper surface thereof;
a plurality of guide members fixedly coupled to said turntable and radially extending toward said rotational shaft;
a clamp including a plurality of clamp jaws movably guided by the plurality of guide members, said clamp having at least one groove formed on its outer periphery for accommodating at least one kind of disk; and
a plurality of resilient members for urging the plurality of clamp jaws toward the rotational shaft such that said plurality of clamp jaws are centered therearound,
wherein, as said turntable is rotated by said rotational shaft, the disk accommodated on said turntable is clamped by the plurality of clamp jaws, said plurality of clamp jaws being movable in a direction away from said rotational shaft by centrifugal force generated as said turntable is rotated by said rotational shaft and wherein said clamp further includes a plurality of guide holes formed below said at least one groove so that the plurality of clamp jaws are movable along the plurality of guide members through the plurality of guide holes, respectively.

22. A disk clamping apparatus, comprising:
a shaft;
a mechanism, coupled to said shaft, for accommodating a plurality of kinds of disks, said mechanism accommodating one disk at a time;
a plurality of guide members fixedly coupled to said disk accommodating mechanism and extending toward said shaft;
a clamping mechanism having a plurality of clamping portions, said plurality of clamping portions being movably guided by the plurality of guide members, said clamping mechanism, on its outer periphery, having a plurality of grooves for accommodating said plurality of kinds of disks;
urging members for urging the plurality of clamping portions in a first direction to center said plurality of clamping portions around said shaft; and
an actuator, coupled to said shaft, for rotating said shaft,
wherein, as said shaft is rotated by said actuator, a disk accommodated on said disk accommodating mechanism is clamped by said clamping mechanism being moved in a direction opposite to said first direction; and
wherein said clamping mechanism further includes a plurality of guide holes formed below a first groove of said plurality of grooves so that the plurality of clamping portions are movable along the plurality of guide members through the plurality of guide holes, respectively.

* * * * *